US005554901A

United States Patent [19]

Wendel et al.

[11] Patent Number: 5,554,901

[45] Date of Patent: Sep. 10, 1996

[54] SERVO-DRIVE FOR ROTARY ANGLE ADJUSTMENT OF AN ACTUATOR FOR CONTROLLING AN OPENING CROSS-SECTION OF A MEDIUM FLOW LINE

[75] Inventors: Friedrich Wendel, Weissach; Manfred Franz, Ditzingen; Johannes Meiwes, Markgroeningen; Uwe Hammer, Schwieberdingen; Michael Altmann, Loechgau; Dieter Dick, Muehlacker, all of Germany

[73] Assignee: Robert Bosch GmbH, Stuttgart, Germany

[21] Appl. No.: 211,612

[22] PCT Filed: Jul. 17, 1993

[86] PCT No.: PCT/DE93/00630

§ 371 Date: Apr. 11, 1994

§ 102(e) Date: Apr. 11, 1994

[87] PCT Pub. No.: WO94/04807

PCT Pub. Date: Mar. 3, 1994

[30] Foreign Application Priority Data

Aug. 11, 1992 [DE] Germany .......................... 42 26 548.7

[51] Int. Cl.[6] ........................... H02K 21/14; H02K 1/12; F16K 31/02

[52] U.S. Cl. .......................... 310/162; 310/216; 310/254; 251/129.11

[58] Field of Search ................................. 310/49 R, 162, 310/164, 179, 216, 217, 218, 254; 251/129.11

[56] References Cited

U.S. PATENT DOCUMENTS

| | | | |
|---|---|---|---|
| 1,538,196 | 5/1925 | Livingston | 310/217 |
| 2,323,114 | 6/1943 | Bradford et al. | 310/218 |
| 4,262,353 | 4/1981 | Okazaki et al. | 310/162 |
| 4,398,107 | 8/1983 | Fukushima | 310/162 |
| 4,618,792 | 10/1986 | Yates | 310/217 |

FOREIGN PATENT DOCUMENTS 3039521 5/1982 Germany .

*Primary Examiner*—Clayton E. LaBalle
*Attorney, Agent, or Firm*—Edwin E. Greigg; Ronald E. Greigg

[57] ABSTRACT

A known servo-drive including a stator which is formed with two-component design or the exciter winding has to be attached directly to the stator, which is associated with a costly production method. The new servo-drive is to permit easy and cost-effective manufacture with favorable actuation properties. The stator of the servo-drive includes in the region of the poles, weak points which are formed either by recesses or by gaps. An induction core includes a winding which is inserted into a yoke constructed on the stator by which a magnetic field can be induced in the stator. The alternating combination of sheet-metal laminas having gaps and recesses permits the torque/rotary angle characteristic of the servo-drive to be optimized with favorable production properties. The servo-drive for rotary angle adjustment of an actuator is used for example to control the opening cross-section of a medium-conducting flow line in internal combustion engines for the purpose of controlling idling speed.

6 Claims, 2 Drawing Sheets

SERVO-DRIVE FOR ROTARY ANGLE ADJUSTMENT OF AN ACTUATOR FOR CONTROLLING AN OPENING CROSS-SECTION OF A MEDIUM FLOW LINE

PRIOR ART

The invention is based on a servo-drive for rotary angle adjustment of an actuator as set forth hereinafter. A servo-drive is already known (DE 30 39 521 A1) in which a rotor is partially surrounded in the circumferential direction by a stator which is provided with asymmetrically constructed pole shoes and in which a magnetic field can be induced by means of an exciter winding. Since, in the prior art device, the stator is either of a two-component design or the exciter winding has to be applied directly to the stator, and as a result of the asymmetrical construction of the stator poles, this device is associated with a complex production method which is very expensive particularly for series production.

ADVANTAGES OF THE INVENTION

The servo-drive according to the invention has an advantage that the stator which surrounds the rotor is of single-component design, as a result of which simple insertion of the exciter winding into the stator is ensured. This is achieved in that the stator completely surrounds the rotor and the exciter winding is inserted between two legs constructed on the outside of the stator. Moreover, the construction of weak points in the stator poles permits the torque/rotary angle characteristic of the servo-drive to be optimized.

By means of the measures disclosed in the subclaims, advantageous further developments and improvements of the servo-drive specified herein are possible. It is particularly advantageous to produce the stator from individual sheet-metal laminas which each have recesses and/or gaps in the region of the poles and are combined to form a single-component stator packet. In particular by virtue of the sheet-metal laminas which have gaps, the magnetic properties of the stator are influenced as desired whilst the coherence of the stator packet is maintained by means of the sheet-metal laminas having recesses, and, in this way, a production-friendly further processing is ensured.

DRAWING

An exemplary embodiment of the invention is illustrated in the drawing in simplified form and explained in greater detail in the subsequent description. FIG. 1 shows a longitudinal section through a rotary actuator designed according to the invention, FIG. 2 shows a section along the line II—II in FIG. 1.

DESCRIPTION OF THE EXEMPLARY EMBODIMENT

Figure 1:
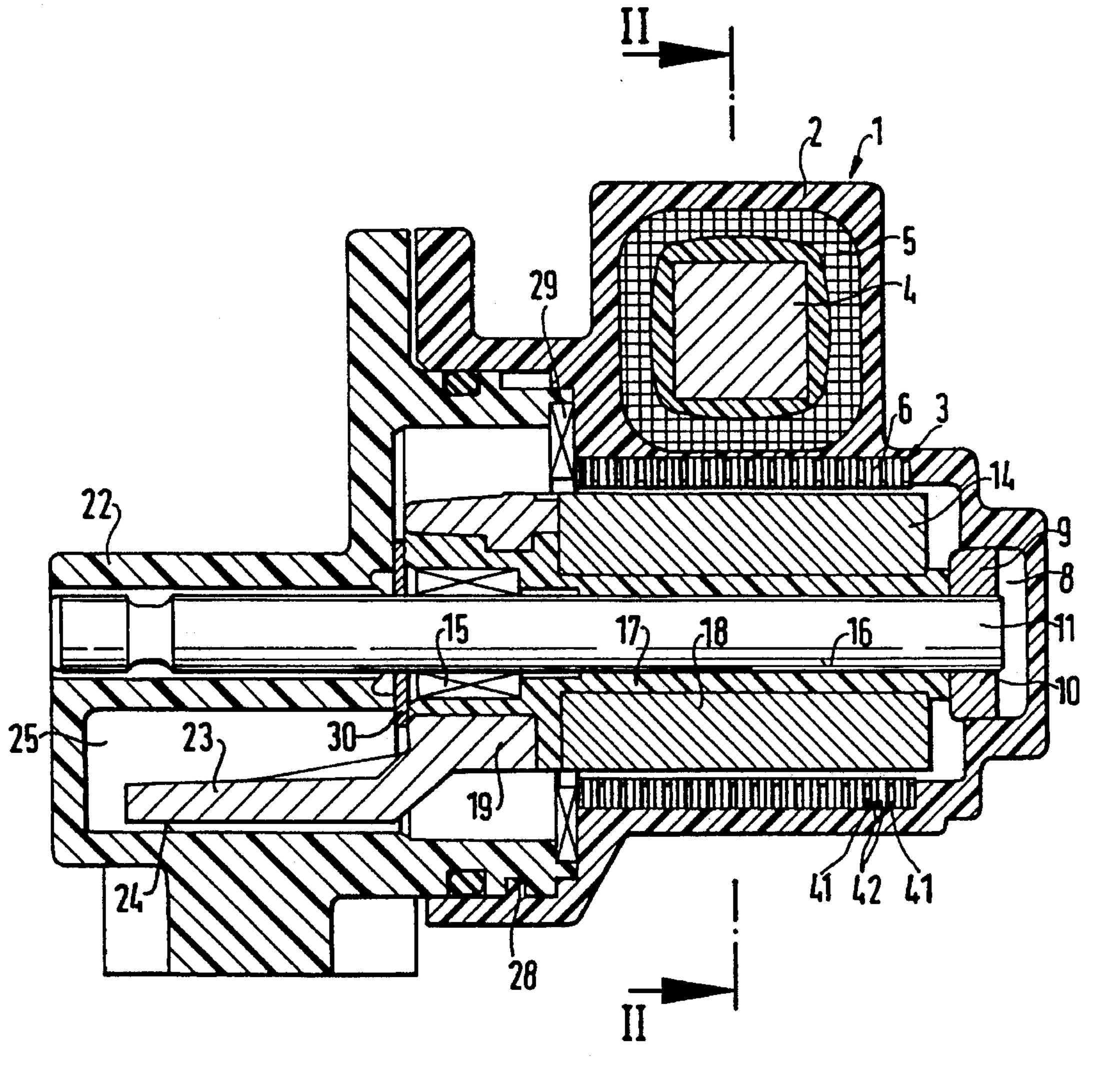

In FIG. 1, a rotary actuator for controlling the cross-section of an opening of a medium-conducting flow line for internal combustion engines is illustrated. A rotary actuator of this kind serves for example for controlling the idling speed of the internal combustion engine and is arranged in a bypass line which shunts out a throttle valve. The rotary actuator is composed of a servo-drive which is labelled with 1 and an actuator housing 22. The servo-drive 1 has a drive housing 2 made of plastic which encloses a stator 3, consisting for example of sheet-metal laminas 6, and a winding

5 arranged around an induction core 4. In a depression 8 of the drive housing 2 a holding element 9 is seated, the said holding element 9 has a bore 10 into which one end of an axle 11 is inserted. A carrier element 17 is rotatably mounted, for example by means of a roller bearing 15 and a sliding seat 16, on the axle 11 which is secured on the other hand in the actuator housing 22, for example by means of encapsulation by injection moulding. In the circumferential direction, the carrier element 17 is surrounded by a diametrically magnetized permanent magnet 18 and a control element 19, the parts 17 and 18 forming together a rotor 14 of the actuator drive 1 which turns the control element 19.

On the control element 19, a control arm 23 is constructed which protrudes into a control chamber 25, located in the actuator housing 22, and whose outer face 24 is shaped in such a way that it corresponds as precisely as possible to the internal diameter of an actuation window (not illustrated in greater detail in the drawing) of a flow opening leading into the control chamber 25, and clears the flow opening to a greater or lesser extent depending on the rotary angle position of the rotor 14.

The drive housing 2 and the actuator housing 22 are connected in a positively engaging manner in the axial direction by means of a bayonet-type connection 28 and are clamped without play with the aid of a spring washer 29. A washer 30 located on the axle 11 between actuator housing 22 and carrier element 17 ensures low-friction rotatability of the rotor 14.

Figure 2:
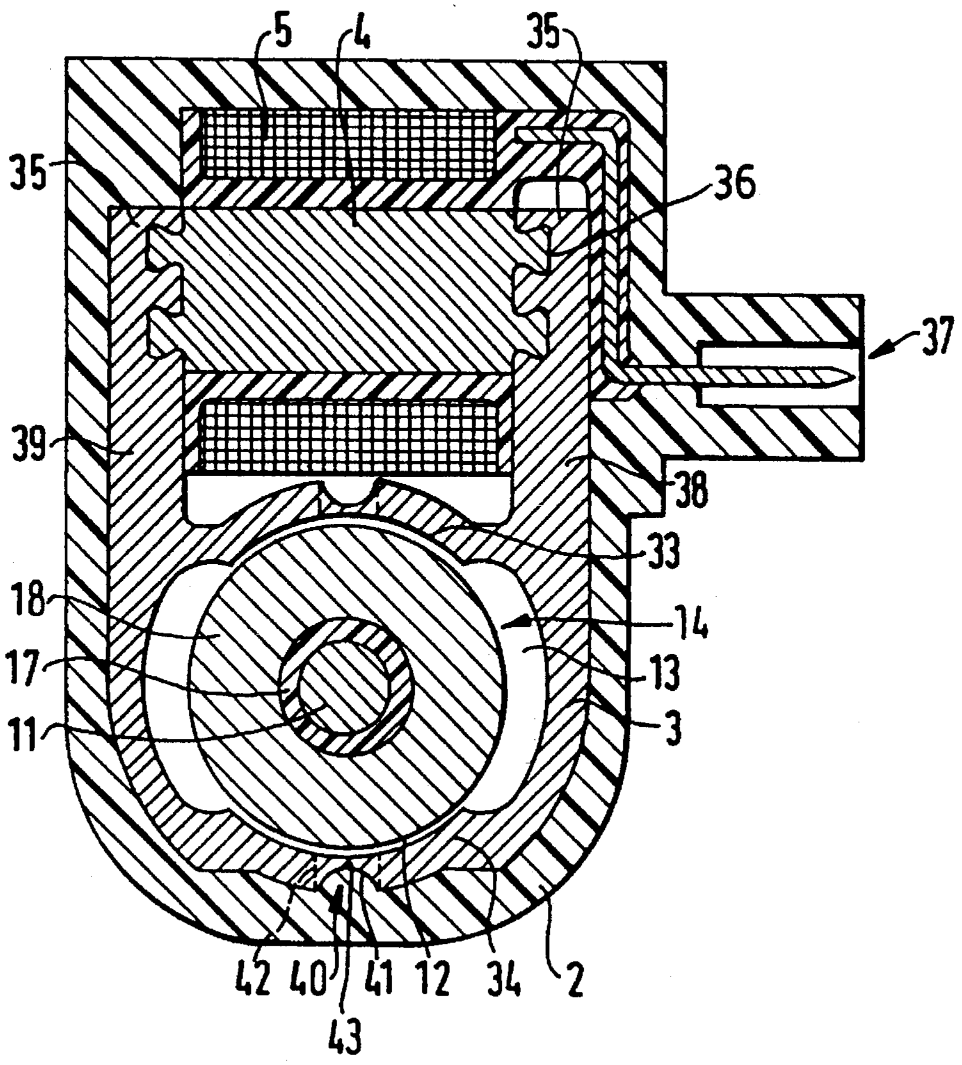

In FIG. 2, a section is shown along the line II—II in FIG. 1. On the axle 11 there is the carrier element 17 on which the permanent magnet 18 is concentrically arranged, the said carrier element 17 being surrounded by the stator 3 in the circumferential direction. The stator 3 has a through-opening 13 into which the rotor 14 protrudes. On an inner face of the through-opening 13 of the stator 3 there are two poles 33, 34 which are arranged at a distance from one another, are located opposite one another and in the radial direction form with the rotor 14 an air gap 12 which is as narrow as possible. On the outside of the stator 3, a yoke 35 is formed which has two legs 38, 39 which extend approximately parallel to and at a distance from one another and between which an induction core 4 is inserted in a known manner, for example by means of a dove-tail connection 36. The poles 33, 34 engage around the rotor 14 in such a way that one pole 33 connects the two legs 38 and 39 on the side of the through-opening 13 facing the induction core 4 and one pole 34 is located on the side of the rotor 14 facing away from the induction core 4. The induction core 4 is surrounded by at least one winding 5 which can be supplied with a voltage via plug elements 37.

In a region of the stator 3 formed by the poles 33, 34, there is in each case at least one weak point 40 which is formed by at least one recess 41 and/or by at least one gap 42 illustrated in FIG. 2 by broken lines. The arrangement of the weak points 40 in the region of the poles 33, 34 does not have to be symmetrical with respect to the poles 33, 34, as illustrated in FIG. 2, as a result of which the torque/rotary angle characteristic of the actuator drive 1 can be matched to a desired application purpose. The weak points 40 are advantageously arranged here located opposite one another.

Each recess 41 is characterized by a reduction in the cross-sectional area of the stator 3 in the radial direction in the region formed by the poles 33, 34 to a residual cross-section 43 by means of which the material cohesion is still maintained. The recesses 41 can assume any desired shape here, for example semi-circular, slot-shaped, groove-shaped or annular and can be open or closed towards the inside or outside of the stator 3. In the exemplary embodiment according to FIG. 2, semi-circular recesses 41 are shown which are open towards the outside of the stator 3. In contrast with this, each gap 42 is characterized by a complete separation of the cross-sectional face of the stator 3 in the radial direction in the region formed by the poles 33, 34.

When the stator 3 is constructed using sheet-metal laminas 6, more than one gap 42 may be formed on each sheet-metal lamina 6 so that each sheet-metal lamina 6 consists of a plurality of parts. In order to ensure the cohesion of the stator 3, alternating layering of sheet-metal laminas 6 which have gaps is provided. In this arrangement, in each case one sheet-metal lamina 6 with gaps 42 can be arranged between two sheet-metal laminas 6 with recesses 41. However a plurality of sheet-metal laminas 6 with gaps 42 can also be located between two sheet-metal laminas 6 with recesses. In the exemplary embodiment according to FIG. 1, by way of example in each case two sheet-metal laminas 6 with gaps 42 are arranged between two sheet-metal laminas 6 with recesses 41.

The alternately layered sheet-metal laminas 6 are packed in a known manner, for example by pressing, to form a single-component stator 3. The material cohesion is provided here by the sheet-metal laminas 6 which no longer have any gaps 42. In a further embodiment (not illustrated in the drawing), sheet-metal laminas 6 are alternately packed to form a single-component stator 3, the said sheet-metal laminas 6 each having a recess 41 in the pole 33 which is arranged between the two legs 38 and 39 and faces the induction core 4 and in each case a gap 42 in the pole 34 which faces away from the induction core 4, with sheet-metal laminas 6 which each have a gap 42 in the pole 33 which is arranged between the two legs 38 and 39 and faces the induction core 4 and in each case a recess 41 in the pole 34 which faces the induction core 4. Moreover, the layering of sheet-metal laminas 6 which each have only recesses 41 or gaps 42 with sheet-metal laminas 6 which each have a recess 41 and a gap 42 is possible in any desired sequence to form a single-component stator 3.

The induction core 4 is inserted with the winding 5 into the packet-type stator. Subsequently, the drive housing 2 is formed by encapsulating with plastic by means of injection moulding. By applying a voltage to the plug elements 37, a magnetic field is induced in the induction core 4 and in the stator 3 by means of the winding 5, which leads to rotation of the rotor 14, and thus to the control element 19. The magnetic field is therefore conducted via the pole 33 located between the two legs 38, 39 and the pole 34 which is located between the projection of the two legs and faces away from the induction core 4, an increased effect of the magnetic field on the permanent magnet 18 and thus on the rotor 14 via the air gap 12 occurring in each case as desired by virtue of the weak point 40.

We claim:

1. A servo-drive of a rotary actuator for controlling an opening cross-section of a medium conducting flow line for internal combustion engines, comprising a diametrically magnetized rotor (14) having a longitudinal axis, said magnetized rotor is for rotation about a longitudinal axis, a stator (3) with two poles (33, 34) and at least one winding for inducing a magnetic field, said stator (3) has a yoke (35) with two legs (38, 39) and a through-opening (13) and is formed by stacking first and second individual sheet-metal laminas (6) alternately, and the rotor (14) is arranged in the through-opening (13), the two poles (33, 34) are constructed on a wall of the through-opening (13) in such a way that one pole (33) is located on a side of the through-opening (13) facing the at least one winding (5) which is located between the legs (38, 39) and one pole (34) which is located on a side of the through-opening (13) facing away from the at least one winding (5), and at least one weak point (40) in the form of a recess (41) is formed in the two poles (33, 34) of said first sheet-metal lamina, and a gap (42) that completely penetrates the two poles (33,34) in a radial direction is formed in a wall of said second sheet metal lamina in each pole (33, 34) in the radial direction, wherein the second group of sheet-metal laminas (6) having gaps (42) as weak points (40) is disposed between said first group of sheet-metal laminas (6) having recesses (41) as weak points (40), and wherein in a multiple repeating way, the second group of sheet-metal laminas (6) with gaps (42) is disposed between the first group of sheet-metal laminas (6) with recesses (41) and are stacked in alternation to form the stator (3).

2. A servo-drive according to claim 1, in which the recess (41) is in a semicircular, groovelike, slotlike or annular form.

3. A servo-drive according to claim 1, in which the weak points (40) are disposed asymmetrically with respect to the poles (33, 34).

4. A servo-drive of a rotary actuator for controlling an opening cross-section of a medium conducting flow line for internal combustion engines, comprising a diametrically magnetized rotor (14) having a longitudinal axis, said magnetized rotor is for rotation about its longitudinal axis, a stator (3) with first and second poles (33, 34) and at least one winding for inducing a magnetic field, said stator (3) has a yoke (35) with two legs (38, 39) and a through-opening (13) and is formed by stacking first and second individual sheet-metal laminas (6) alternately, and the rotor (14) is arranged in the through-opening (13), the first and second poles (33, 34) are constructed on a wall of the through-opening (13) in such a way that the first pole (33) is located on a side of the through-opening (13) facing at least one winding (5) which is located between the legs (38, 39) and the second pole (34) is located on a side of the through-opening (13) facing away from the at least one winding (5), and at least one weak point (40) in the form of a recess (41) is formed in the first pole (33) and a gap (42) that completely penetrates the second pole (34) in the radial direction is formed in a wall of the second pole formed by each of said sheet-metal laminas of the second pole (34), wherein the first group of sheet-metal laminas (6) which have at least one recess (41) in the pole (33) located between the two legs (38, 39) and facing the at least one winding (5) and in each case said gap (42) in the sheet metal lamina forming the second pole (34) facing away from the at least one winding (5) are alternately stacked to form a single-component stator (3).

5. A servo-drive according to claim 4, in which the recess (41) is in a semicircular, groovelike, slotlike or annular form.

6. A servo-drive according to claim 4, in which the weak points (40) are disposed asymmetrically with respect to the poles (33, 34).

* * * * *